United States Patent [19]

Simon et al.

[11] Patent Number: 4,976,412
[45] Date of Patent: Dec. 11, 1990

[54] RESILIENT SUPPORT WITH ANISOTROPIC STIFFNESSES PARTICULARLY FOR BODYWORK SUSPENSIONS

[75] Inventors: Jean-Michel Simon, Clamart; Jacques Taniere, Chateaudun; Jean-Pierre Ciolczyk, Montargis; Michel Domer, Valdampierre, all of France

[73] Assignee: Hutchinson, France

[21] Appl. No.: 432,080

[22] Filed: Nov. 6, 1989

[30] Foreign Application Priority Data

Nov. 9, 1988 [FR] France .................. 88 14638

[51] Int. Cl.⁵ .......................................... F16M 13/00
[52] U.S. Cl. ........................... 248/634; 248/632; 267/140.5; 267/141.1; 267/141.2; 296/35.1
[58] Field of Search ............... 248/632, 633, 634, 635, 248/638; 267/140.5, 141, 141.1, 141.2; 180/312; 296/35.1

[56] References Cited

U.S. PATENT DOCUMENTS

| | | | |
|---|---|---|---|
| 3,873,077 | 3/1975 | Jorn .................................. | 267/152 |
| 3,957,127 | 5/1976 | Bouchard et al. ............... | 248/634 X |
| 3,990,737 | 11/1976 | Palmer ............................. | 296/35.1 |
| 4,447,034 | 5/1984 | Gottlob ............................ | 248/634 |
| 4,645,190 | 2/1987 | Schad ............................... | 248/634 X |
| 4,660,813 | 4/1987 | Reuter ............................. | 248/634 X |
| 4,727,695 | 3/1988 | Kemeny ........................... | 248/634 X |
| 4,744,547 | 5/1988 | Hartel .............................. | 267/141 |
| 4,871,150 | 10/1989 | Le Salver et al. ............... | 267/140.5 X |

FOREIGN PATENT DOCUMENTS

| | | |
|---|---|---|
| 683167 | 10/1939 | Denmark . |
| 732016 | 1/1943 | Denmark . |
| 1391349 | 1/1965 | France . |
| 0270842 | 11/1987 | Japan .................. 180/312 |
| 0273119 | 11/1987 | Japan .................. 180/312 |

*Primary Examiner*—Ramon O. Ramirez
*Attorney, Agent, or Firm*—Larson and Taylor

[57] ABSTRACT

A resilient support with anisotropic stiffnesses is provided particularly for bodywork suspensions, comprising as main resilient element at least one beam (1) extending in a transverse direction (y), the ends (3) of this beam (1) being secured to a first frame (6) adapted to be fixed to one of said assemblies and its middle part to a second frame (11) adapted to be fixed to the other assembly, and in that the cross section of this beam (1) has a shape such that at the level of the second beam (11) it has the desired stiffnesses, particularly in the longitudinal direction (x axis) and in the direction of the main load (z axis).

13 Claims, 2 Drawing Sheets

RESILIENT SUPPORT WITH ANISOTROPIC STIFFNESSES PARTICULARLY FOR BODYWORK SUSPENSIONS

The present invention relates to a resilient support with anisotropic stiffnesses, particularly for vehicle bodywork suspensions, in particular at the level of the cross member of the rear undercarriage.

In this type of application, it is desirable to obtain a support having very high anisotropy in the directions of its three orthogonal axes, x, y and z. In particular, it is desirable to obtain:

a very high stiffness Ky in the transverse direction of the vehicle, or y axis, namely a stiffness of the order of 10 000 N/mm, in order to avoid lateral displacement of the bodywork with respect to the wheels in a bend, a very low stiffness Kx in the longitudinal direction of the vehicle, or x axis, namely a stiffness of the order of 50 N/mm, so as to reduce as much as possible the road noise of the vehicle (Ky/Kx of the order of 200), a mean stiffness Kz in the vertical direction (main direction of the load) or z axis, namely a stiffness of the order of 750 N/mm.

Of course, all these values are given solely by way of indication.

Up to now, many difficulties have been met with in obtaining the high anisotropy desired, and in particular said ratio of 200 between the transverse and longitudinal stiffnesses, even with resilient stratified rubber/metal studs.

The aim of the present invention is to solve this problem and, for this, it consists in forming a support comprising both a main resilient element intended to support the load and means for fixing this resilient element respectively to two assemblies between which the support is to be inserted, said support being essentially characterized in that it comprises as main resilient element at least one beam extending in said transverse direction, the ends of this beam being fixed to a first frame adapted to be fixed to one of said assemblies and its middle portion to a second frame adapted to be fixed to the other assembly, and in that the cross section of this beam has a shape such that at the level of said second frame it has the desired stiffnesses, respectively in the longitudinal direction (x axis) and in the direction of the main load (z axis).

It will be understood that by judiciously choosing the dimensions, in the x and z directions respectively, of the cross section of the beam, it is possible to confer thereon, at the level of said second frame, the desired moduli of bending resistance and so to confer on the whole of the support the desired anisotropic stiffnesses, considering further that the high or very high stiffness in the transverse direction (y axis) will be easy to obtain, the beam working in this direction under traction or compression, without buckling and naturally having a very high stiffness along this axis.

It goes without saying that the cross section of the beam can be given various shapes (rectangular, elliptic, etc.) as long as the desired ratio between the stiffnesses along x and z are obtained by the selection of the proportions of their dimensions.

To facilitate adjustment, particularly of the stiffness in direction z, it is even possible to provide the beam with a central recess decreasing the modulus of elasticity to bending with respect to forces exerted in this direction.

It is also possible to use several beams per support, generally disposed parallel to each other and/or in the extension of each other and which may be identical.

In this case, buckling of the beams may be easily avoided by fixing an elastomer block between the beams of each pair.

Whatever the shape and arrangement of the beams it will be further advantageous to use for their construction composite materials having a glass, carbon or similar resistant fibre basis, coated with a polymerized synthetic resin.

It is also possible to form the beams from rods of resistant fibres coated with a polymerized synthetic resin, these rods, in the form of bundles of parallel rods, extending in the transverse direction being embedded in an elastomer material matrix. This elastomer material may serve for damping the vibrations to which the beams may be subjected, and at the same time as protective envelope protecting the beams from external agents (gravel, humidity).

As for the bundles of parallel rods, it will be understood that in this case they will work especially under traction, their ends then having to be nipped at the level of the connecting means between the beams and the frames.

The composite materials are particularly advantageous in the application considered, because of their high extension capacity. It is also possible to design the same structures with spring steel.

Whatever the material forming the beams and whatever their structure, it will always be advantageous to coat them with a protective elastomer envelope similar to the one mentioned above for the beams comprising bundles of rods, for protecting them against the environment and adjusting the damping, as already mentioned, and also for conveniently providing a connection with the metal parts of the frames.

As for the means for fixing the main resilient element formed by the beam or beams to the assemblies between which the support is to be inserted, they may be of any appropriate kind, as long as they do not substantially modify the behaviour of the beams with respect to the forces and as long as they provide a reliable connection with the frames, without vibrations.

Such means, as well as different constructions of beams will be better understood from the embodiments now given, by way of examples only, with reference to the figures of the accompanying drawings in which.

Figure 1:
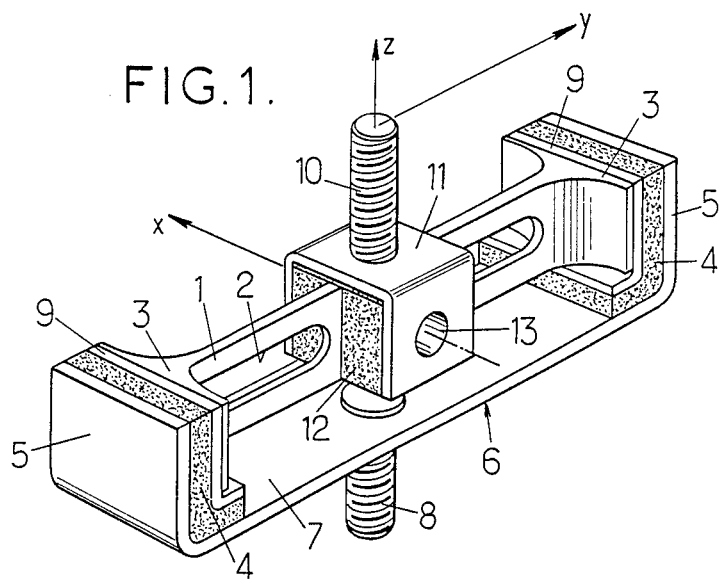
FIG. 1 is a perspective view of a first embodiment of a support according to the invention.

In FIG. 1, the beam of the support has been referenced 1; it is made from a composite material and has centrally a longitudinal and central recess 2 extending between the end feet 3. The main directions in which this beam will have to work have been represented by the axes x, y and z. In the case of a support used on the rear cross member of a vehicle, it will be recalled that x represents the longitudinal direction of the vehicle, in which the support will have to have the lowest stiffness; y is the transverse direction (direction of the rear cross member of the vehicle), in which it will have to have a very high stiffness and z the vertical direction, in which the stiffness will have to be intermediate. It is essentially the ratio between this last stiffness and the longitudinal stiffness which can be adjusted, in the way mentioned above, by the choice and shape of the dimensions of the cross section of the beam.

In the transverse direction y, with beam 1 considered, in a first approximation and in the absence of buckling, as having an extremely high stiffness and in any case greater than that which is desired, the stiffness of the support in this direction will depend essentially on the degree of embedment of the ends of the beam, and it is therefore the latter which will have to be adjusted.

In the case of a beam working under compression, such as the one in FIG. 1, it is especially by the choice of the thickness of the elastomer blocks 4 inserted between and bonded to metal bushings 9 bonded to the feet 3 of the beam and the flanges 5 of a first metal frame in the form of a stirrup 6, that this stiffness of the support may then be adjusted in the transverse direction. As a general rule, this thickness will then be fairly small. To avoid tipping of flanges 5 because of the transverse forces, they may be provided with external stiffeners (not shown). On the other hand there is no need to stiffen the bottom 7 of frame 6 to the extent that this bottom cannot buckle, since it bears on the cross member of the vehicle (not shown) and is fixed thereto by a screw or similar 8.

The second frame, adapted to be fixed to the bodywork of the vehicle by a screw or similar 10 has been referenced 11 and may also be formed from a metal stirrup piece, covering the middle portion of beam 1. Fixing between this middle portion and frame 11 may be provided by bonded elastomer blocks 12 and/or by bolting (hole 13). Such bolting may also be used at the ends of the beam, particularly for the case where it works under traction.

Figure 2:
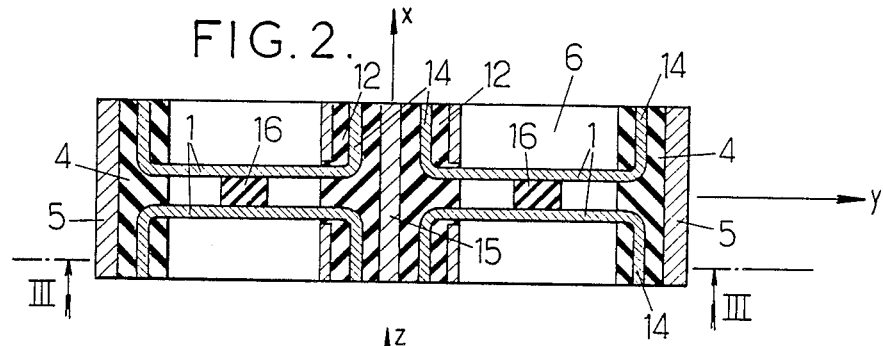
FIG. 2 shows, in horizontal section through line II—II of FIG. 3, a variant of the support with several beams.
Figure 3:
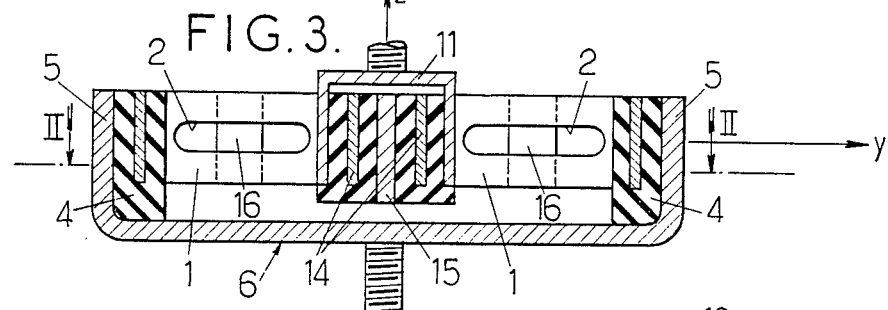
FIG. 3 is a sectional view through line III—III of FIG. 2.

It should be noted that in FIGS. 1 to 3 the elastomer protective coating for the beams has not been shown, so as not to overload the drawing.

In FIGS. 2 and 3, four identical beams have been used made from a composite material, again referenced 1, disposed in two pairs of parallel beams, the two pairs being aligned. It can be seen that each beam 1 has, in a plane view, a U shape with centrally a longitudinal recess 2. The end flanges 14 of the beams serve for anchoring them in elastomer blocks connected to the frames, namely end blocks 4 bonded to flanges 5 of a first metal frame 6, and central blocks 12 bonded between the flanges of a metal stirrup piece 11, forming the second frame, and a median plate 15.

At 16 have been shown elastomer blocks bonded between the two beams of each pair and eliminating the danger of buckling.

Figure 4:
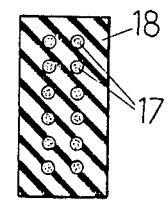
FIG. 4 is a cross sectional view of the beam in yet another embodiment.

Finally, in FIG. 4 has been shown the cross section of another type of beam, formed of rods of resistant fibres 17 coated with a synthetic polymerized resin, these rods, in the form of bundles of parallel rods, extending in the transverse direction, being embedded in an elastomer material matrix 18. In general, such a beam would work under traction, the ends of the rods being nipped, as mentioned above.

Figure 5:
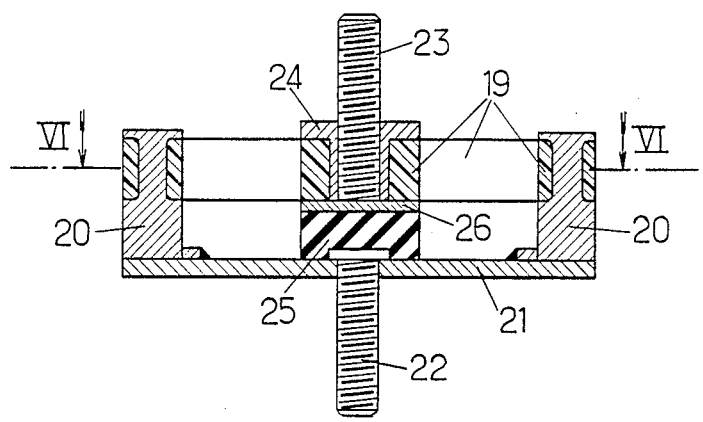
FIG. 5 is a sectional view through line V—V of FIG. 6 again showing another variant of the beam according to the invention.
Figure 6:
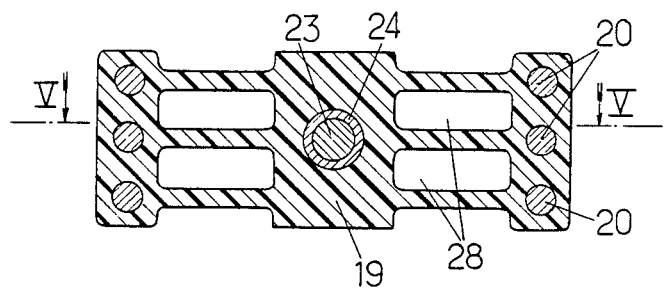
FIG. 6 is a sectional view through line VI—VI of FIG. 5.

In FIGS. 5 and 6 yet another possible form of a multiple beam has been shown, which is made for example from thermoplastic material reinforced by resistant fibres: it may then be made by injection in a mould. The means for fixing the ends of this beam, referenced 19, to the corresponding assembly comprise inserts 20, advantageously made from metal, disposed previously in said mould at the appropriate positions. After removal from the mould, the inserts 20 equipping the beam are connected, for example by welding, to a fixing plate or frame 21 with which the corresponding fixing screw is integral providing rigid connection with said assembly.

As for the connection between the fixing screw 23 providing rigid fixing with the other assembly and the central part of the beam 19, it may be provided by a hollow charge transfer metal insert, referenced at 24. The desired resilience along the z axis may be obtained by the beam and/or by a rubber cushion 25 bonded between plate 21 and a plate 26 fast with insert 24.

Figure 7:
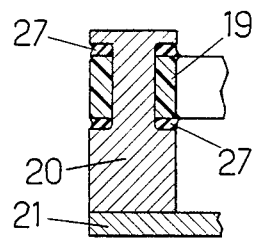
FIG. 7 is a partial vertical sectional view, at the level of the end inserts, showing a variant of detail.

FIG. 7 shows a variant, in which the desired elasticity in direction z may be obtained, at each end of beam 19, by rubber washers 27 inserted between the beam and shoulders of inserts 20.

Finally, it should be noted that the recesses 28 of beam 19, shown in FIG. 6, may be filled wholly or partially by a damping elastomer.

We claim:

1. Resilient support with anisotropic stiffnesses, particularly for bodywork suspensions, this support comprising on the one hand a main resilient element for supporting the load and having different stiffnesses along its three orthogonal axes, and particularly a stiffness in the transverse direction (y axis) of one or more orders of size greater than the stiffness in the longitudinal direction (x axis), the stiffness in the direction of the main load (or vertical direction, z axis) being intermediate between the two preceding ones, and on the other hand means for fixing this resilient element respectively to two assemblies between which the support is to be inserted, characterized in that the support comprises as a main resilient element at least one beam (1) extending in said transverse direction (y), the ends (3) of this beam (1) being secured to a first frame (6) adapted to be fixed to one of said assemblies and the median part of the beam being secured to a second frame (11) adapted to be fixed to the other assembly, and in that the cross section of this beam (1) has a shape such that at the level of said second frame (11) it has the desired stiffnesses, respectively in the longitudinal direction (x axis) and in the direction of the main load (z axis).

2. Support according to claim 1, characterized in that said beam (1) is provided with a central recess (2).

3. Support according to claim 1, characterized in that the support comprises several beam s(1) generally disposed parallel to each other and/or in the extension of each other.

4. Support according to claim 3, wherein for a plurality of beam is positioned as a pair of beams in an extension of each other, an elastomer block (16) is fixed between the beams (1) of each pair.

5. Support according to claim 3, characterized in that said beam or beams (1) is or are formed from a composite material, with a glass, carbon or similar resistant fibre basis, coated with a polymerized synthetic resin.

6. Support according to claim 3, characterized in that said beam or beams (1) is or are made from spring steel.

7. Support according to claim 3, characterized in that said beam or beams (1) is or are coated with a protective elastomer material.

8. Support according to claim 3, characterized in that said beam or beams (1) is or are formed from rods of resistant fibres (17) coated with a polymerized synthetic resin, these rods, in the form of bundles of parallel rods extending in the transverse direction, being embedded in an elastomer material matrix.

9. Support according to claim 3, characterized in that said fixing means comprise on the one hand said first frame (6), which has the shape of a U stirrup piece between flanges (5) of which and the ends (3) of said beam or beams (1) is or are inserted and fixed elastomer blocks (4) of small thickness and, on the other hand, said frame (11), also having the form of a U stirrup piece, which covers the median part of the beam (1) with interpositioning of elastomer blocks (12).

10. Support according to claim 3, characterized in that said beam or beams (1) has or have a U shape with flanges (14) which serve for anchoring in elastomer blocks (4, 12) connected to the first (6) and second (11) frames.

11. Support according to claim 9, characterized in that fixing between said beam or beams (1) and the frames (6, 11) is or are provided by bonding respective elastomer blocks (4, 12) and/or by bolting.

12. Support according to claim 1, characterized in that the support comprises at least one thermoplastic material beam (19) which is equipped, during moulding, with inserts (20, 24) forming part of the means for fixing to the respective assemblies.

13. Support according to claim 12, characterized in that the beam (19) is reinforced with resistant fibres.

* * * * *